Patented Nov. 29, 1938

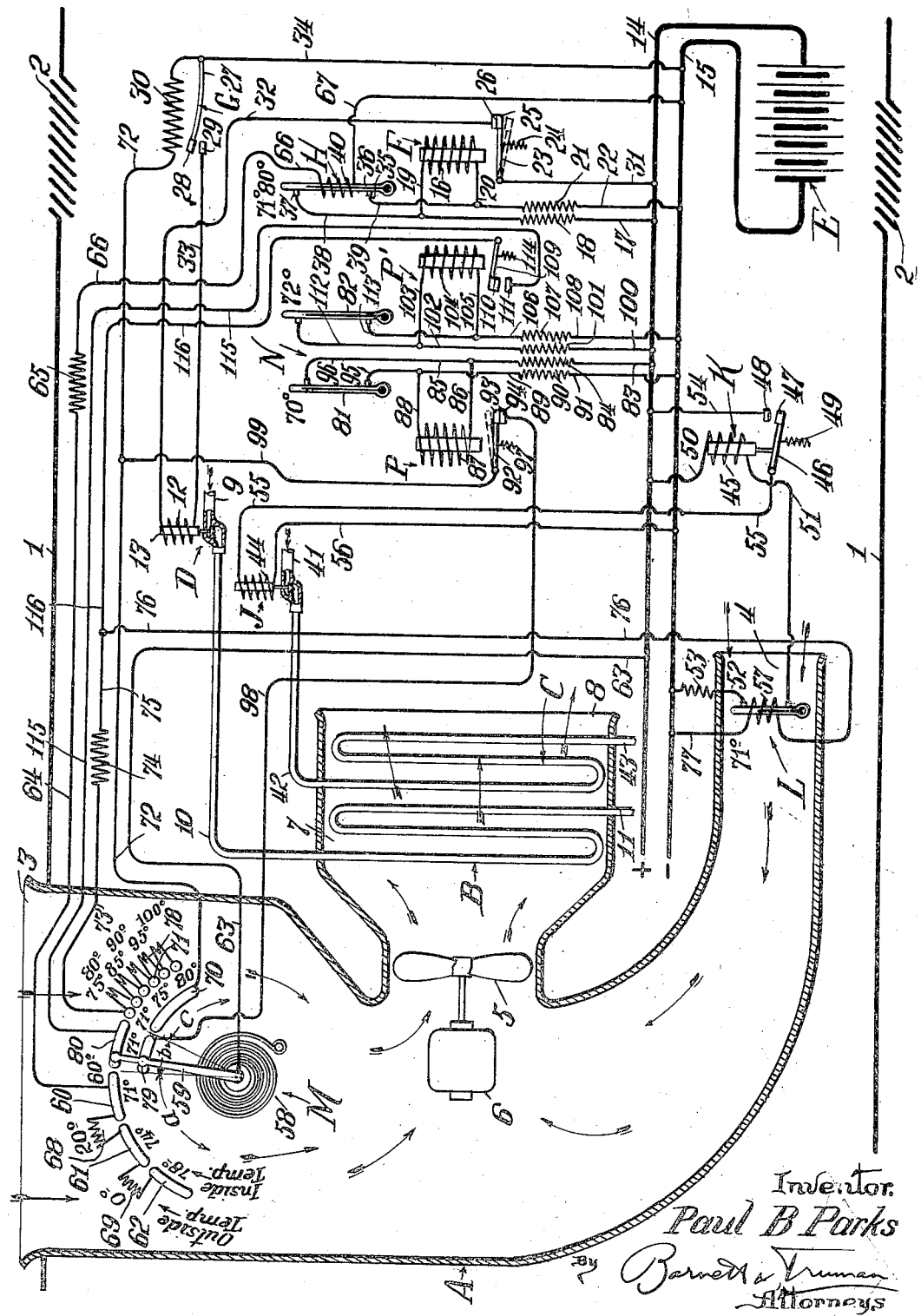

2,138,505

UNITED STATES PATENT OFFICE 2,138,505

TEMPERATURE CONTROL SYSTEM

Paul B. Parks, Oak Park, Ill., assignor to Vapor Car Heating Company, Inc., Chicago, Ill., a corporation of New York Application June 25, 1936, Serial No. 87,186

11 Claims. (Cl. 236—1)

This invention relates to certain new and useful improvements in a temperature control system adapted to maintain certain selected temperatures within a space or enclosure, said temperatures being predetermined but variable under certain conditions in accordance with changes in the temperature outside said space. An entirely automatic electric actuating and controlling means is provided for maintaining these inside temperatures.

As is well known, below a certain minimum outside temperature, for example 60° Fahrenheit, it will ordinarily be necessary to add a certain amount of heat to the air within an enclosure in order to maintain a desired comfortable temperature, for example 71° Fahrenheit, within the enclosure. During this lower outside temperature range no cooling means will be necessary. It is also desirable to increase somewhat the amount of heat supplied to the air within the enclosure, that is step up the controlling temperature at the inside thermostat as the outside temperature falls so as to compensate for increased heat losses when doors or windows are opened, or for any other reasons, and thus maintain the inside temperature at approximately the desired level. On the other hand, as the outside temperature rises above a predetermined maximum, for example 75° Fahrenheit, it will normally be necessary to utilize a cooling or refrigerating means to subtract heat from the air within the enclosure in order to maintain the desired inside comfortable temperature. During this upper range of outside temperatures there will normally be no necessity for using a heating means. Also during this upper range it is desirable to progressively step up the inside temperature, but at a lesser rate, as the outside temperature rises so as not to permit too great a difference to exist between the inside and outside temperatures. During the intermediate outside temperature range, for example between 60° Fahrenheit and 75° Fahrenheit, it is desirable to maintain a substantially constant inside temperature, for example about 71°. In order to accomplish this it is sometimes necessary to add heat to and sometimes necessary to subtract heat from the inside air. Assuming the outside temperature to be 65° Fahrenheit, it will ordinarily be necessary to add a small amount of heat to the inside air in order to maintain the temperature within the enclosure at the desired level. However, there are causes other than the outside temperature which determine the temperature within the enclosure even though no cooling or heating means is utilized. For example, the inside temperature will rise much higher on a sunny day, when the walls of the enclosure are subjected to intense sunlight, than on a cloudy day. For similar reasons the inside temperature will be lower at night than in the daytime. Also the inside temperature will rise much higher when the enclosed space is peopled with many occupants than it will when empty. All of these, and other, causes will produce a variation in the inside temperature even though the outside temperature remains constant. It may be that at the assumed outside temperature of 65° Fahrenheit the inside temperature will rise appreciably above the desired inside temperature of 71° and it will be necessary to subtract heat or utilize the cooling means in order to maintain the inside temperature at the desired level. In other words, during this intermediate zone of outside temperatures it is desirable to control the inside temperature directly in response to inside temperature changes rather than in response to temperature changes outside the enclosure.

According to the present invention both heating means and cooling means are provided for conditioning the air circulated within the enclosed space. A thermostatic means within the space is provided for controlling the supply of heat to the heating means so as to maintain a desired inside temperature, and a similar inside thermostatic means is provided for controlling the cooling means. A third thermostatic means responsive to changes in temperature of the outside air is adapted to selectively condition the first mentioned thermostatic means for use when the outside temperature is below a predetermined minimum and to control this inside thermostatic means so as to determine the inside temperature that will be maintained. This outside thermostatic means also conditions the second mentioned inside thermostatic means for operation when the outside temperature is above a predetermined maximum and controls the operation of this inside thermostatic means so as to determine the inside temperature that will be maintained. A fourth thermostatic means is conditioned for operation by the outside thermostatic means when the outside temperatures are within the intermediate range, this fourth thermostatic means being adapted to selectively control either the heating means or the cooling means so as to add or subtract heat as may be necessary in order to maintain a substantially constant temperature within the enclosure.

The principal object of this invention is to provide an improved temperature control system of the type briefly described hereinabove and disclosed more in detail in the specifications which follow.

Another object is to provide a temperature control system in which the inside temperatures are controllably varied in response to outside temperature changes during upper and lower outside temperature ranges, the inside temperature being controlled entirely in response to inside temperature changes within an intermediate outside temperature range.

Another object is to provide improved means for maintaining selected temperatures within an enclosure in accordance with temperature changes outside said enclosure.

Other objects and advantages of this invention will be more apparent from the following detailed description of one approved form of apparatus constructed and operating according to the principles of this invention.

The accompanying drawing is a diagrammatic view showing the air circulating and temperature-conditioning system, as well as the wiring diagram of the temperature-controlling apparatus.

At 1 is indicated a portion of the outlines of an enclosed space which may be provided with shuttered outlets 2 for exhausting a predetermined portion of the inside air. The air circulating system comprises a conduit system indicated generally at A and including an inlet 3 communicating with the air outside the space through which a certain proportion of outside air may be drawn in. A second return inlet 4 communicates with the air within the space. The fan or blower indicated at 5 and driven by motor 6 propels the air drawn from inlets 3 and 4 through the temperature conditioning chamber 7 and thence through outlet 8 back into the enclosed space. It will be understood that the air inlets 3 and 4 may be provided with suitably controlled dampers or shutters so as to determine the relative proportions of the returned air and the fresh air drawn from outside the enclosure. Such control devices are well known and are not here shown. Within the conditioning chamber 7 are positioned a heating means B and a cooling means C, each of which may be in the form of a suitable coil or radiator.

Steam or other suitable heating medium for the heater B is delivered from the source of supply through pipe 9 to the control or cut-off valve indicated generally at D, thence through pipe 10 to the heater B, the medium being exhausted through pipe 11. The valve D as here shown is normally self-closing, but includes the magnetic coil 12 which when energized will lift the combined core and valve stem 13 and thus open the valve. At E is shown a source of electric power, for example a battery, from the terminals of which extend the positive and negative mains 14 and 15. At F is indicated a relay including a coil 16 which is normally energized through the following circuit: From positive main 14 through wire 17, resistance 18, wire 19, coil 16, wire 20, resistance 21, and wire 22 to the negative main 15. When the relay is energized it will draw up the armature 23 against the resistance of spring 24 and hold the movable contact 25 in engagement with the fixed contact 26. At G is indicated a thermally controlled switch comprising a bi-metallic arm 27 carrying a contact 28 normally held in engagement with a fixed contact 29. However, when an energizing current is passed through the heating coil 30 of this switch mechanism, the bar 27 will be warped as shown in the figure so as to separate the contacts 28 and 29. Under normal heating conditions, that is when the outside temperature is below the predetermined minimum as hereinafter described, the switch G will remain closed, and if the relay F is energized an actuating circuit for holding the valve D open will be completed as follows: From positive main 14 through wire 31, armature 23, contacts 25 and 26, wire 32, valve coil 12, wire 33, switch contacts 29 and 28, bar 27, and wire 34 to the negative main 15. Under such conditions heating medium will be supplied to the coil B.

At H is indicated a thermostat suitably positioned within the enclosure so as to respond to temperature changes therein. This thermostat is of the mercury-column type comprising a lower contact 35 that is always in engagement with the mercury column 36 and an upper contact 37 which will be engaged by the mercury column when the thermostat is subjected to a predetermined, relatively high, temperature, for example 80° Fahrenheit. The thermostat is connected across the terminals of the relay coil 16 through the following circuit: Wires 19 and 38, contact 37, mercury column 36, contact 35, and wires 39 and 20. Thus when the thermostat H is subjected to a temperature of 80°, a circuit will be completed short-circuiting the relay F whereupon the armature 23 will be pulled down by spring 24 thus breaking the actuating circuit for valve D whereupon the valve will close and cut off the supply of heating medium to heater B. Under ordinary conditions it will be desirable to cut off the heat supply before this relatively high temperature is reached, and for this reason an electric heating coil 40 is associated with the thermostat H so as to add additional heat to the thermostat and cause it to function at a lower temperature. In the example here shown, when coil 40 is fully energized the thermostat will function at 71° Fahrenheit. It will thus be seen that with heater 40 fully energized, the heat supply will be turned on whenever the temperature inside the enclosure falls below 71°, and will be turned off when the temperature rises above 71°. As hereinafter disclosed, means are provided for regulating the current supplied to heater 40 so that a lesser degree of heat may be added to the thermostat so that it will function to permit somewhat higher temperatures to be reached within the enclosure.

It will be understood that the heating coil 40 for thermostat H should be suitably covered and insulated so as not to be influenced by air-currents or other disturbing influences. This thermostat is preferably of the type disclosed and claimed in the copending application of Parks and Miller, Serial No. 19,568, filed May 3, 1935.

Refrigerating medium is supplied from a suitable source through pipe 41 and control valve J through pipe 42 to the coil C and is discharged through pipe 43. The valve J may be of the same type as valve D previously described and comprises a magnetic coil 44 which when energized will open the normally closed valve. The relay K is generally similar to the relay F already described and comprises the actuating coil 45, armature 46, and contacts 47 and 48. The coil 45 will normally be deenergized and the armature 46 pulled down by spring 49 so as to separate the contacts 47 and 48. At L is shown a thermostat which may be similar in all respects to the thermostat H already described. This thermostat controls the cooling system and may be positioned anywhere within the enclosure but is preferably positioned within the intake duct for the return air so as to be responsive to the temperature of the air withdrawn from the space for re-circulation. When a certain relatively high temperature, for example 80° Fahrenheit, is reached, this thermostat will complete a circuit for energizing the relay K as follows: From positive main 14 through wire 50, coil 45, wire 51, thermostat L, wire 52, and resistance 53 to the negative main 15. The energization of relay K will close the contacts 47 and 48 thus completing a circuit for opening valve J as follows: From positive main 14 through wire 54, contacts 48 and 47, armature 46, wire 55, valve operating coil 44, and wire 56 to the negative main. Thus when this high temperature is reached the valve J will be opened and the refrigerating coil C will begin to function. Since it is usually desirable to maintain a lower temperature than 80° within the enclosure, an electric heating coil 57 is associated with thermostat L and when this heater is fully energized the thermostat L will complete its circuit and cause the cooling means to begin to function at a much lower temperature, for example 71° Fahrenheit.

At M is indicated a third thermostatic apparatus which is designed to function in response to temperature changes of the outside air. Preferably this thermostat M is positioned within the intake duct 3 so as not to be affected by sunlight or outside moisture conditions. This thermostat M, in the form here shown, comprises a thermostatic coil 58 adapted to swing the contact arm 59 in a clockwise direction as the outside temperature rises and in a counter-clockwise direction as the outside temperature falls. As the outside temperature falls below a certain predetermined minimum, for example 60° Fahrenheit, contact arm 59 will be swung through the normal heating range indicated at $a$. As the outside temperature rises above a predetermined maximum, for example 75° Fahrenheit, the contact arm 59 will be swung through the normal cooling range indicated at $c$. As the outside temperature fluctuates between the predetermined minimum and maximum the arm 59 will be moved through the intermediate range or zone indicated at $b$.

As contact arm 59 moves through the heating range $a$ it will successively engage with a series of arcuate contacts indicated in the present example at 60, 61 and 62. Assuming that the outside temperature has fallen to 59°, contact arm 59 will now be in engagement with arcuate contact 60 and a circuit for energizing the heating element 40 of thermostat H will now be completed as follows: From positive main 14 through wire 63, contact arm 59, arcuate contact 60, wire 64, resistance 65, wire 66, heating element 40, and wire 67 to the negative main. Heating element 40 will now be fully energized and thermostat H will be operative at 71° to cut off the heat supply. If the outside temperature continues to fall to some lower temperature, for example 20°, thermostat arm 59 will move into engagement with the second arcuate contact 61 and the resistance 68 positioned between the two contacts 60 and 61 will now be thrown into this last mentioned circuit so as to decrease the current flowing through heating element 40. As a consequence the thermostat will not function to cut off the heat supply until a somewhat higher temperature, for example 74° Fahrenheit, is reached. If the outside temperature falls to 0°, the contact arm 59 will move into engagement with the third contact 62 and an additional resistance 69 will be placed in the circuit so as to further decrease the current flowing through heating element 40 and thermostat H will now function to maintain a still higher temperature, for example 78° Fahrenheit. It will be understood that the temperatures here given are merely by way of illustration and that the number of resistances for decreasing the heating current and the inside temperatures maintained might be selected as found most desirable. As will be hereinafter apparent, during this lower range of outside temperatures the heating element 57 of thermostat L will not be energized and consequently the refrigerating means will be inoperative since the inside temperature will never be permitted to rise as high as the temperature at which thermostat L will function, provided heating element 57 is deenergized.

Assuming now that the outside temperature rises to 75° or above, the thermostatic arm 59 will swing through the upper range $c$. In this range the swinging arm 59 will engage with an arcuate contact 70, and also with some selected one of a series of contacts indicated generally at 71. Throughout this temperature range the heating element 40 of thermostat H will be deenergized and consequently the relay F will be normally energized so as to complete the actuating circuit for valve D through this relay. However a circuit for energizing the heating element 30 of switch G thereby opening this actuating circuit will normally be completed as follows: From positive main 14 through wire 63, swinging arm 59, arcuate contact 70, wire 72, heating element 30, and wire 34 to the negative main. Therefore switch G will be held open and the supply of heat will be continuously cut off. Assuming that the outside temperature is 75°, arm 59 will be in engagement with the first of the contacts 71 and a circuit for energizing the heating element 57 of thermostat L will be completed as follows: From positive main 14 through wire 63, swinging arm 59, contact 71, wire 73, resistance 74, wire 75, wire 76, heating element 57, and wire 77 to the negative main. Thermostat L will therefore function to cause the refrigerating means C to begin its cooling operation when a temperature of 71° is reached within the space.

It is found to be uncomfortable for the people entering and leaving the space or enclosure to have too great a difference between the temperature inside the space and the temperature outside the space. That is, it is desirable to permit the temperature within the space to rise somewhat higher as the outside temperature rises, but it is desirable to have the inside temperature rise at a lesser rate than the outside temperature, that is the difference between the temperatures will increase as the outside temperature goes up. As here shown, a series of resistances indicated generally at 78 are connected between the several contacts 71. As the arm 59 moves along the contacts 71 more of this resistance will be progressively inserted in the energizing circuit for heating element 57. Assuming that the outside temperature has risen to 85°, enough of this resistance will be inserted in the circuit to cause a temperature of, for example, 75° to be maintained within the enclosure by the thermostat L. However, there is a limit beyond which the temperature within the space should not be permitted to rise. Assuming that the outside temperature has risen to 100°, the arm 59 will have moved into engagement with the last of the contacts 71 (or perhaps beyond this series of contacts). Under these circumstances the energizing circuit for heating element 57 will be completely broken and thermostat L will now function to maintain a fixed temperature of, for example, 80° for which this thermostat is adjusted when the heating element 57 is not energized. In other words, for any outside temperature of 100° or higher a constant temperature of 80° will not be exceeded within the space whose temperature is being controlled.

Now let us assume that the outside temperature is within the intermediate range b, that is somewhere between 60° and 75° Fahrenheit. It will be noted that at this time neither of the circuits hereinabove described for energizing the heating elements 57 or 40 will be completed. In this zone of operations the swinging contact arm 59 will be continuously in engagement with both of the fixed arcuate contacts 79 and 80. At N is indicated a thermostatic assembly consisting of the two similar thermostats 81 and 82, each of which may be of the same type as the thermostats H and L except that no heating element is provided to vary the temperature at which these thermostats will function. The thermostats respond solely to changes in temperature inside the space, and may be suitably positioned at any place within the enclosure, for example adjacent the thermostat H. The two similar relays P and P' are controlled respectively by the thermostats 81 and 82. These relays are similar to the relays F and K except that the circuits controlled thereby are opened when the relays are energized and closed when the relays are deenergized. The relay P is normally energized over the following circuit: From positive main 14 through wire 83, resistance 84, wire 85, wire 86, magnet coil 87 of the relay, wires 88 and 89, resistance 90, and wire 91 to the negative main. When so energized the armature 92 will be drawn up to the dotted line position so as to separate the contacts 93 and 94. The mercury column of thermostat 81 is adapted to engage the upper fixed contact at a predetermined inside temperature, for example 70° Fahrenheit. At such time a circuit through this thermostat will be completed short circuiting the coil 87 of relay P as follows: From one terminal of this coil through wires 88 and 95, thermostat 81, and wires 96 and 86 to the other terminal of the coil. This will deenergize the relay and permit spring 97 to draw the movable contact 93 into engagement with fixed contact 94. A circuit energizing the heating element 30 of thermal switch G will now be completed as follows: From positive main 14 through wire 63, swinging arm 59, arcuate contact 79, wire 98, relay contacts 94 and 93, armature 92, wires 99 and 72, heating element 30, and wire 34 to the negative main. It will be understood that at this time the energizing circuit for valve D will be normally closed through the switch of relay F since the inside temperature is below 80° and the circuit through thermostat H will not be closed. However, when the inside temperature reaches 70°, as already described, the heating element 30 will be energized and will open the switch G thereby breaking the valve actuating circuit and permitting valve D to close. However, if the temperature within the space falls below 70° the last described energizing circuit for thermal switch G will be broken and this switch permitted to close thereby opening the valve D and permitting the heater B to function.

Relay P' is normally energized over the following circuit: From positive main 14 through wire 100, resistance 101, wires 102 and 103, magnet coil 104 of the relay, wires 105 and 106, resistance 107, and wire 108 to the negative main. When so energized the armature 109 will be lifted so as to separate the contacts 110 and 111. When thermostat 82 is subjected to a predetermined inside temperature, for example 72° Fahrenheit, a circuit short circuiting the relay P' will be completed as follows: From one terminal of coil 104 through wires 103 and 112, thermostat 82, and wires 113 and 105 to the other terminal of the coil. This will deenergize the relay so that contacts 110 and 111 will be brought into engagement by spring 114. A circuit energizing the heating element 57 of thermostat L will now be completed as follows: From the positive main through wire 63, swinging arm 59, arcuate contact 80, wire 115, contacts 111 and 110, armature 109, wires 116 and 76, heater coil 57, and wire 77 to the negative main. This will condition thermostat L to function at 71° and since the inside temperature is now 72° the thermostat L will function to put the cooling device C in operation as already described.

It will now be seen that as long as the outside temperature is in the intermediate zone b, that is between 60° and 75°, the temperature conditioning mechanism will be entirely under the control of the inside thermostatic assembly N and the inside temperature will not be permitted to fall below 70° or rise above 72°. Of course the temperatures for which thermostats 81 and 82 are set might be selected as desired, but as here shown this mechanism is adapted to maintain an average temperature of about 71° within the enclosure as long as the outside temperature is within this intermediate range and regardless of any changes in this outside temperature. In the example shown in the drawing, the outside temperature is about 65° whereas the inside temperature is approximately 71°. If the enclosure is unoccupied, and is not at this time subjected to the direct rays of the sun, as for example at night, the temperature within the space will probably fall and when this temperature goes below 70° thermostat 81 will function to cause the radiator B to add heat to the air within the enclosure. On the other hand, supposing that the space is subjected to the direct rays of the sun, or houses a number of occupants so as to be affected by the heat produced by these occupants, the temperature within the space may rise above 72° even though the outside temperature remains at 65°. Under such conditions, thermostat 82 will function to cause the cooling device C to function and reduce the temperature within the space so as to maintain the desired 71° temperature.

It will be noted that the temperature within the space is regulated automatically at all times so as to maintain a desired comfortable temperature therein, and allowance is not only made for changes in outside temperature but also for the effect of the "sun load", that is the heating influence of direct sun rays upon the space, as well as heat imparted to the air within the space from other sources such as the number of occupants therein. During the lower range of outside temperatures when only heat is required, the control is brought about by the cooperative action of inside and outside thermostats and is proportioned in accordance with changes in outside temperature. A similar conjoint control by means of inside and outside thermostats is used during the upper outside temperature range when only refrigerating is necessary. During the intermediate or normal outside temperature range, the temperature is entirely controlled by inside thermostatic means in response to inside temperature changes and is not influenced in any way by outside temperature changes. The only part the outside thermostat plays at this time is to condition the last mentioned inside thermostatic means for operation.

I claim:

1. Mechanism for regulating the temperature within a space comprising thermostatic means responsive to temperature changes within the space, thermostatic means responsive to temperature changes outside the space, and electrical operating connections between said inside and outside thermostatic means whereby the inside temperature is controlled conjointly by the inside and outside means when the outside temperature is below a predetermined minimum or above a predetermined maximum so that the inside temperature will be varied in accordance with outside temperature changes, and the inside temperature will be controlled entirely by the inside thermostatic means regardless of outside temperature changes when the outside temperature is between the predetermined minimum and maximum.

2. Mechanism for regulating the temperature within a space comprising a heating means, a cooling means, thermostatic means responsive to temperature changes within the space, thermostatic means responsive to temperature changes outside the space, and electrical connections between said several means whereby the heating means is controlled conjointly by the inside and outside thermostatic means when the outside temperature is below a predetermined minimum and the cooling means is controlled conjointly by the inside and outside thermostatic means when the outside temperature is above a predetermined maximum so as to maintain an inside temperature which is varied in accordance with outside temperature changes, and both the heating and cooling means are controlled by the inside thermostatic means when the outside temperature is between the minimum and maximum to maintain the inside temperature within predetermined narrow limits regardless of outside temperature changes.

3. Mechanism for regulating the temperature within a space comprising in combination, means for heating the air within the space, means for cooling the air within the space, thermostatic means responsive to changes in the temperature of the outside air, thermostatic means responsive to inside temperature changes cooperating with the outside thermostatic means when the outside temperature is below a predetermined minimum for controlling the heating means to maintain a predetermined inside temperature, thermostatic means responsive to inside temperature changes cooperating with the outside thermostatic means when the outside temperature is above a predetermined maximum for controlling the cooling means to maintain a predetermined inside temperature, and thermostatic means cooperating with the outside thermostatic means when the outside temperature is in the intermediate range between the predetermined outside minimum and maximum for selectively causing either the heating or cooling means to function to maintain the inside temperature within certain predetermined narrow limits.

4. Mechanism for regulating the temperature within a space comprising in combination, means for heating the air within the space, means for cooling the air within the space, thermostatic means responsive to changes in the temperature of the outside air, thermostatic means responsive to inside temperature changes cooperating with the outside thermostatic means when the outside temperature is below a predetermined minimum for controlling the heating means to maintain a predetermined inside temperature, said cooperating thermostatic means functioning to step up the predetermined inside temperature as the outside temperature falls, thermostatic means responsive to inside temperature changes cooperating with the outside thermostatic means when the outside temperature is above a predetermined maximum for controlling the cooling means to maintain a predetermined inside temperature, and thermostatic means cooperating with the outside thermostatic means when the outside temperature is in the intermediate range between the predetermined outside minimum and maximum for selectively causing either the heating or cooling means to function to maintain the inside temperature within certain predetermined narrow limits.

5. Mechanism for regulating the temperature within a space comprising in combination, means for heating the air within the space, means for cooling the air within the space, thermostatic means responsive to changes in the temperature of the outside air, thermostatic means responsive to inside temperature changes cooperating with the outside thermostatic means when the outside temperature is below a predetermined minimum for controlling the heating means to maintain a predetermined inside temperature, thermostatic means responsive to inside temperature changes cooperating with the outside thermostatic means when the outside temperature is above a predetermined maximum for controlling the cooling means to maintain a predetermined inside temperature, said last mentioned cooperating thermostatic means functioning to progressively step up but at a lesser rate the predetermined inside temperature as the outside temperature rises, and thermostatic means cooperating with the outside thermostatic means when the outside temperature is in the intermediate range between the predetermined outside minimum and maximum for selectively causing either the heating or cooling means to function to maintain the inside temperature within certain predetermined narrow limits.

6. Mechanism for regulating the temperature within a space comprising in combination, means for heating the air within the space, means for cooling the air within the space, thermostatic means responsive to changes in the temperature of the outside air, thermostatic means responsive to inside temperature changes cooperating with the outside thermostatic means when the outside temperature is below a predetermined minimum for controlling the heating means to maintain a predetermined inside temperature, said cooperating thermostatic means functioning to step up the predetermined inside temperature as the outside temperature falls, thermostatic means responsive to inside temperature changes cooperating with the outside thermostatic means when the outside temperature is above a predetermined maximum for controlling the cooling means to maintain a predetermined inside temperature, said last mentioned cooperating thermostatic means functioning to progressively step up but at a lesser rate the predetermined inside temperature as the outside temperature rises, and thermostatic means cooperating with the outside thermostatic means when the outside temperature is in the intermediate range between the predetermined outside minimum and maximum for selectively causing either the heating or cooling means to function to maintain the inside temperature within certain predetermined narrow limits.

7. In means for regulating the temperature within a space, means for heating the air within the space, and electrically actuated control mechanism for said heating means comprising means including a normally closed circuit for causing the heating means to supply heat to the air, means including a thermostat responsive to temperature changes within the space normally functioning to break the circuit and cut off the heat supply when a certain relatively high temperature is reached within the space, an electric heating means for supplying a controlled amount of additional heat to the thermostat so as to cut off the heat supply at a selected predetermined lower temperature within the space, a thermostatic means responsive to temperature changes outside the space and functioning when the outside temperature is below a predetermined minimum to cause the electric heating means to be energized and to regulate the supply of current thereto so as to cause the temperature within the space to be stepped up as the outside temperature falls, said outside thermostatic means also deenergizing the electric heater when the outside temperature rises above the predetermined minimum, and means also conditioned for operation by the outside thermostat when the outside temperature rises above the predetermined minimum comprising a second thermostat responsive to temperature changes within the space for breaking the first-mentioned closed circuit to cut off the heating means when the inside temperature rises above a predetermined maximum.

8. In means for regulating the temperature within a space, means for heating the air within the space, and electrically actuated control mechanism for said heating means comprising means including a normally closed circuit for causing the heating means to supply heat to the air, means including a thermostat responsive to temperature changes within the space normally functioning to break the circuit and cut off the heat supply when a certain relatively high temperature is reached within the space, an electric heating means for supplying a controlled amount of additional heat to the thermostat so as to cut off the heat supply at a selected predetermined lower temperature within the space, a thermostatic means responsive to temperature changes outside the space and functioning when the outside temperature is below a predetermined minimum to cause the electric-heating means to be energized and to regulate the supply of current thereto so as to cause the temperature within the space to be stepped up as the outside temperature falls, said outside thermostatic means also deenergizing the electric heater when the outside temperature rises above the predetermined minimum, means also conditioned for operation by the outside thermostat when the outside temperature rises above the predetermined minimum comprising a second thermostat responsive to temperature changes within the space for breaking the first-mentioned closed circuit to cut off the heating means when the inside temperature rises above a predetermined maximum, means for cooling the air within the space, and thermostatic means responsive to temperature changes within the space for controlling the cooling means, said outside thermostatic means also functioning to condition said cooling means for operation only when the outside temperature rises above the predetermined minimum.

9. In means for regulating the temperature within a space, means for cooling the air within the space, and electrically actuated control mechanism for said cooling means including a thermostat responsive to temperature changes within the space and functioning at a certain relatively high temperature to render the cooling means operative to subtract heat from the air within the space, an electric heating means for supplying a controlled amount of additional heat to the thermostat so as to cause the cooling means to function at a selected predetermined lower temperature within the space, a thermostatic means responsive to temperature changes outside the space and functioning when the outside temperature is above a predetermined maximum to cause the electric-heating means to be energized and to regulate the supply of current thereto so as to cause the temperature within the space to be progressively stepped up but at a lesser rate as the outside temperature rises, said outside thermostat also deenergizing the electric-heating means when the outside temperature falls below the predetermined maximum, and means conditioned for operation by the outside thermostat when the outside temperature is below the predetermined maximum comprising a second thermostat responsive to temperature changes within the space for causing the electric-heater to be energized and the cooling means caused to function when the inside temperature rises above a predetermined minimum.

10. In means for regulating the temperature within a space, means for cooling the air within the space, and electrically actuated control mechanism for said cooling means including a thermostat responsive to temperature changes within the space and functioning at a certain relatively high temperature to render the cooling means operative to subtract heat from the air within the space, and electric-heating means for supplying a controlled amount of additional heat to the thermostat so as to cause the cooling means to function at a selected predetermined lower temperature within the space, a thermostatic means responsive to temperature changes outside the space and functioning when the outside temperature is above a predetermined maximum to cause the electric-heating means to be energized and to regulate the supply of current thereto so as to cause the temperature within the space to be progressively stepped up but at a lesser rate as the outside temperature rises, said outside thermostat also deenergizing the electric-heating means when the outside temperature falls below the predetermined maximum, means conditioned for operation by the outside thermostat when the outside temperature is below the predetermined maximum comprising a second thermostat responsive to temperature changes within the space for causing the electric heater to be energized and the cooling means caused to function when the inside temperature rises above a predetermined minimum, means for heating the air within the space, and thermostatic means responsive to temperature changes within the space for controlling the heating means, said outside thermostatic means also functioning to condition said heating means for operation only when the outside temperature falls below the predetermined maximum.

11. Mechanism for regulating the temperature within a space comprising in combination, means for heating the air within the space, means for cooling the air within the space, and electrically actuated controlling mechanism for said heating and cooling means including a thermostat responsive to temperature changes within the space for causing the heat supply to the space to be cut off when a certain relatively high temperature is reached within the space, a second thermostat also responsive to temperature changes within the space and functioning at a relatively high temperature to render the cooling means operative to subtract heat from the air within the space, a separate electric-heating means for each of said thermostats, each said heating means operating to supply a controlled additional amount of heat to the respective thermostat so as to cause the thermostat to function at a selected predetermined lower temperature, a thermostatic means responsive to temperature changes outside the space and operating below a predetermined minimum outside temperature to selectively energize the electric-heating means for the first mentioned thermostat so that progressively higher predetermined inside temperatures will be maintained within the space as the outside temperature falls, said outside thermostatic means operating above a predetermined maximum outside temperature to selectively energize the electric heating means for the second mentioned thermostat so as to maintain lowered temperatures inside the space which temperatures are progressively raised but at a lesser rate as the outside temperature rises, both of said electric-heating means being normally unenergized while the outside temperature is in the intermediate range between the predetermined minimum and maximum, and thermostatic means responsive to inside temperature changes and conditioned for operation by the outside thermostatic means while the outside temperature is in the intermediate range for selectively controlling either the heating means or the cooling means to maintain the inside temperature within predetermined narrow limits.

PAUL B. PARKS.